(12) United States Patent
Kalinsky et al.

(10) Patent No.: US 7,225,909 B1
(45) Date of Patent: Jun. 5, 2007

(54) PTO CLUTCH ASSEMBLY

(75) Inventors: Robert M. Kalinsky, Broadview Heights, OH (US); Scott W. Stevens, Columbia Station, OH (US)

(73) Assignee: Logan Clutch Corporation, Westlake, OH (US)

( * ) Notice: Subject to any disclaimer, the term of this patent is extended or adjusted under 35 U.S.C. 154(b) by 71 days.

(21) Appl. No.: 10/998,184

(22) Filed: Nov. 26, 2004

Related U.S. Application Data

(60) Provisional application No. 60/525,622, filed on Nov. 26, 2003.

(51) Int. Cl.
*F16D 25/08* (2006.01)
(52) U.S. Cl. .............................. 192/85 CA; 192/70.13; 192/110 S; 74/11; 29/401.1
(58) Field of Classification Search .......... 192/85 CA, 192/110 S, 70.13, DIG. 1
See application file for complete search history.

(56) References Cited

U.S. PATENT DOCUMENTS

| | | | | |
|---|---|---|---|---|
| 2,665,112 A | * | 1/1954 | Ashton | ........................ 254/289 |
| 5,400,862 A | * | 3/1995 | Behlke et al. | ............. 180/53.1 |
| 6,148,976 A | * | 11/2000 | Kalinsky | .................. 192/18 A |
| 6,305,515 B1 | * | 10/2001 | Heidenreich et al. | ..... 192/18 A |
| 2006/0032722 A1 | * | 2/2006 | Guinter et al. | .......... 192/85 AA |

* cited by examiner

*Primary Examiner*—Richard M. Lorence
(74) *Attorney, Agent, or Firm*—Daniel D. Wasil; Ralph E. Jocke; Walker & Jocke

(57) ABSTRACT

The PTO clutch assembly (150) is readily connected to a shaft (218). The clutch assembly includes a hub (152), a piston assembly (168), and one or more friction discs (156, 157) positioned between a backplate (154) and a pressure plate (164). The shaft is mated with the hub to rotate therewith. The hub is supported by the shaft at a tapered portion thereof. The piston assembly is supported by the hub. The piston assembly can be actuated to cause the clutch assembly to engage the friction discs to impart drive to the shaft. The clutch assembly permits direct access to the friction discs upon removal of the backplate, without disconnecting the hub from the shaft. The fluidly operated PTO clutch assembly allows for replacement of a mechanical linkage Bell Housing style PTO clutch assembly.

20 Claims, 15 Drawing Sheets

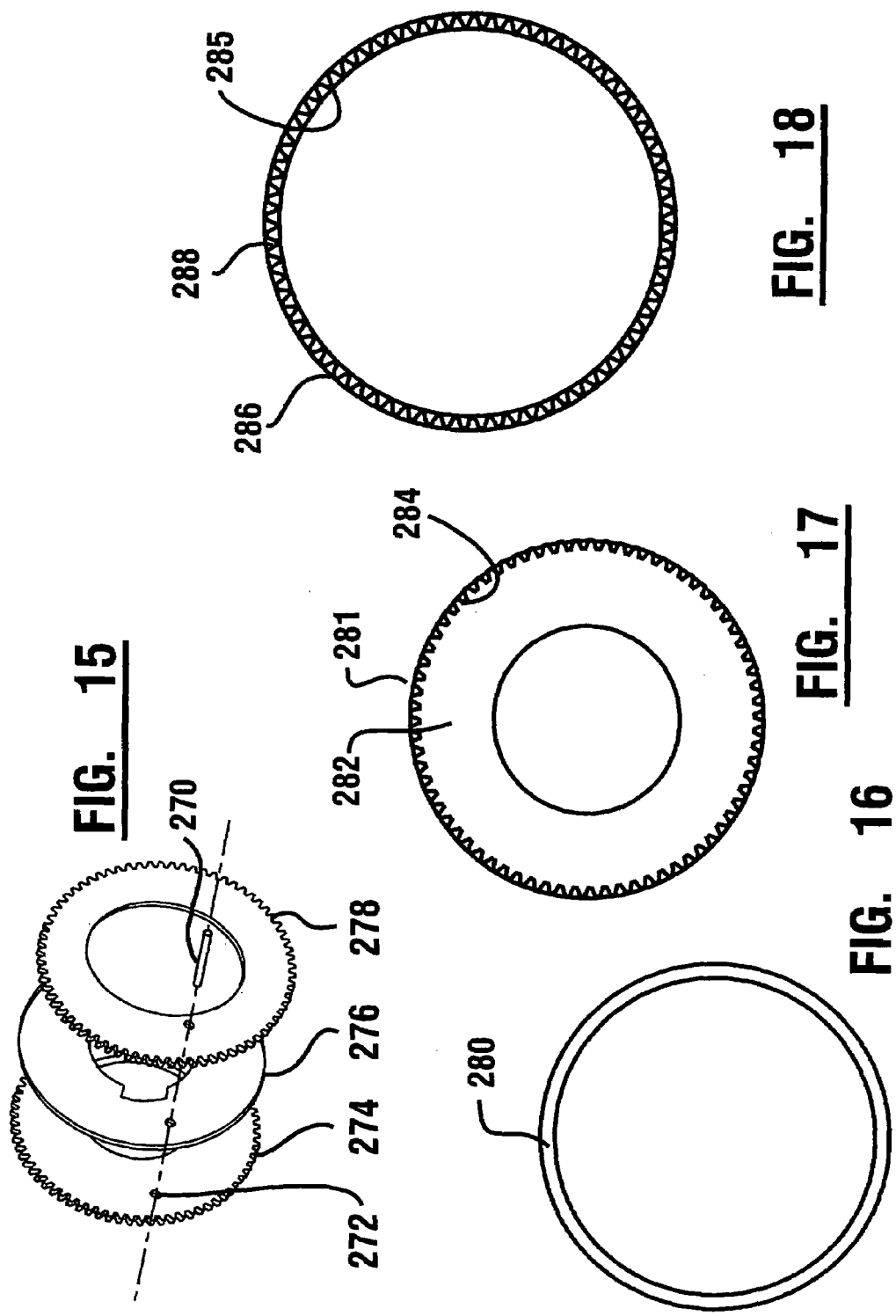

PTO CLUTCH ASSEMBLY

CROSS REFERENCE TO RELATED APPLICATIONS

This application claims the benefit of U.S. Provisional Application No. 60/525,622 filed Nov. 26, 2003.

TECHNICAL FIELD

This invention relates to clutches, particularly to air or fluid actuated PTO clutches.

BACKGROUND ART

Power take off (PTO) clutches and their operation are well known in the art. A PTO clutch is typically arranged surrounding a shaft. A PTO clutch can be used to translate rotation from a drive source, such as an engine flywheel, to drive the shaft via mechanical actuation. As is well known, induced positive engagement of a friction disk can result in translation of flywheel rotation to the shaft. Other components such as tools can then be driven off of the rotating drive shaft.

There are several problems associated with the design and operation of the prior art PTO clutches. For example, mechanical linkages can have a complex arrangement of many parts. Replacement of a particular part can require disassembly of the entire clutch and the handling of numerous non-defective parts. Thus, part replacement can be cumbersome and time consuming.

Thus, there exists a need for a PTO clutch apparatus without complex mechanical linkages and that provides for a simpler and more efficient part replacement process.

DISCLOSURE OF THE INVENTION

It is an object of an exemplary form of the present invention to provide a clutch apparatus and method.

It is an object of an exemplary form of the present invention to provide a clutch apparatus that is more readily repairable.

It is a further object of an exemplary form of the present invention to provide an air-actuated or fluid-actuated PTO clutch assembly which can replace an existing PTO clutch assembly of mechanical linkage.

It is a further object of an exemplary form of the present invention to provide a PTO clutch assembly that can be factory or field retrofitted to replace new or existing Twin Disc Bell Housing style PTO clutches.

It is a further object of an exemplary form of the present invention to provide a clutch kit comprising components of the novel PTO clutch assembly.

It is a further object of an exemplary form of the present invention to provide a method of replacing a PTO clutch assembly or components thereof.

It is a further object of an exemplary form of the present invention to provide a method of using the existing Bell Housing during retrofit of a Twin Disc Bell Housing style PTO clutch.

It is a further object of an exemplary form of the present invention to provide a method of controlling clutch engagement based on machine operation.

Further objects of the present invention will be made apparent from the following Best Mode for Carrying Out Invention and the appended Claims.

The foregoing objects are accomplished in the preferred embodiment of the present invention by an apparatus and method for an air-actuated or a fluid-actuated PTO clutch assembly.

In the exemplary form of the invention the PTO clutch assembly is readily connected via a nut to a tapered shaft to permit drive thereof. The clutch assembly includes one or more friction discs positioned between a rotatable pressure plate and a rotatable friction plate. The shaft is mated with the friction plate to rotate therewith. A piston is pneumatically or fluidly pressure actuated to move the pressure plate against the rotating friction disc(s) to cause rotation of the friction plate. Thus, actuation of the piston results in impartation of drive to the shaft. The PTO clutch assembly allows for replacement of a mechanical linkage Bell Housing style PTO clutch assembly.

BRIEF DESCRIPTION OF DRAWINGS

FIG. 15 shows a friction disc alignment arrangement.

FIG. 16 shows an anti-vibration liner.

FIG. 17 shows a liner adjacent friction disc teeth.

FIG. 18 shows a liner adjacent driver gear teeth.

BEST MODE FOR CARRYING OUT INVENTION

Figure 1:
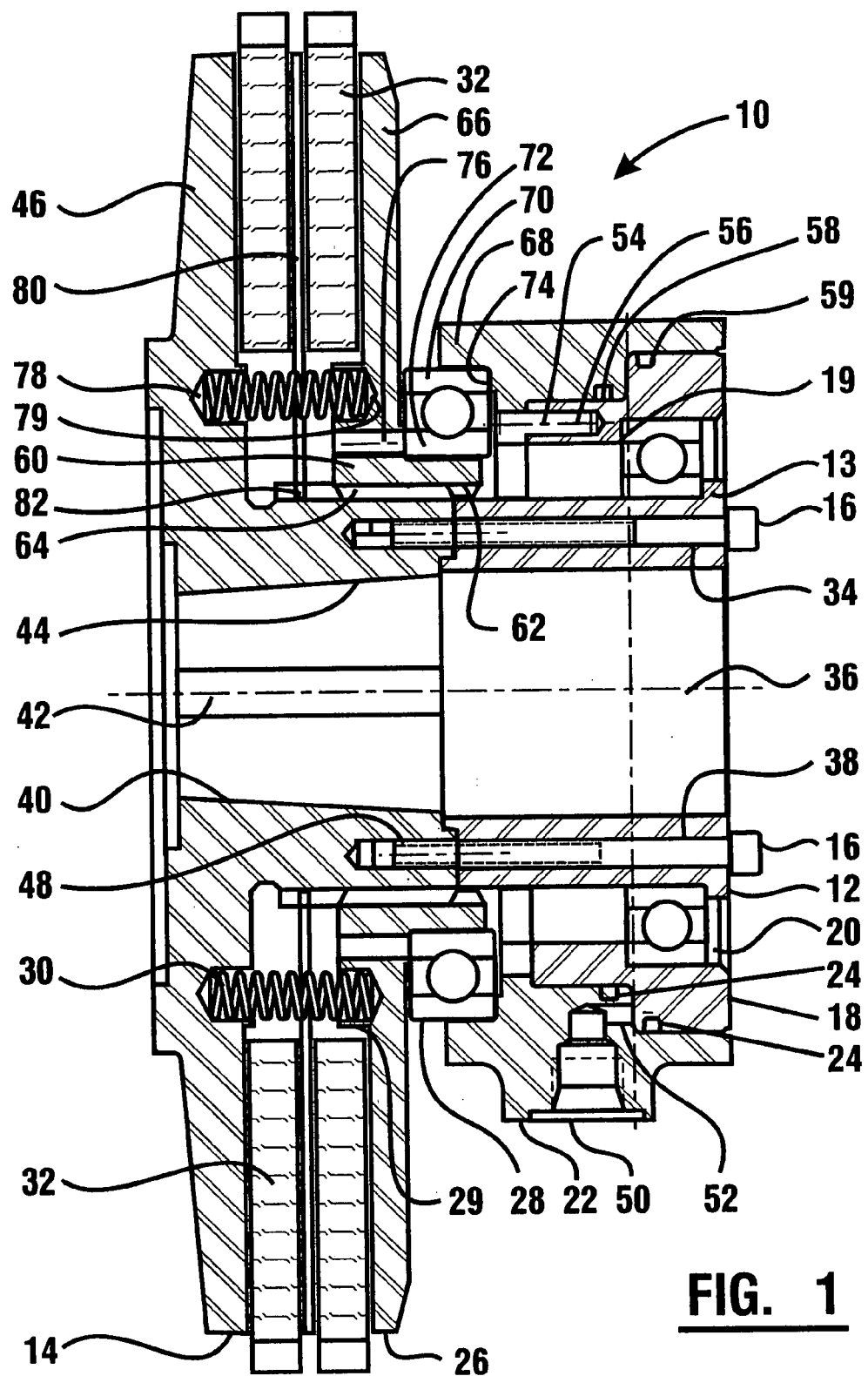
FIG. 1 is a cross-sectional view of a dual disc clutch assembly.

FIG. 1 shows an exemplary clutch apparatus of the present invention. It should be understood that although the clutch apparatus components will be described herein with reference to a PTO clutch apparatus, it is within the scope of the present invention for the novel clutch components to also be applicable with other types of clutches. The clutch components shown in FIG. 1 are connectable to form at least a portion of a PTO clutch assembly 10.

The PTO clutch assembly 10 includes a hub 12, friction plate 14 (which may also be referred to herein as a backplate), connector members 16, housing 18, first bearing arrangement 20, piston assembly 22, O-rings 24, pressure plate 26, second bearing arrangement 28, keeper 29, biasing members 30, and at least one friction disc 32. The clutch assembly 10 can be arranged about a shaft. The clutch assembly 10 can be operated to rotationally drive the shaft (i.e., a drive shaft).

The hub 12 is generally annular and includes a central bore passage 34 configured for arrangement in the assembly to receive and surround a drive shaft. The passage 34 includes a longitudinal axis 36. The hub is rotatable and includes holes, bores, or openings 38, each configured for arrangement in the assembly to receive a respective connector member 16.

The friction plate 14 is rotatable and generally cylindrical. The friction plate 14 includes a central bore passage 40 configured for arrangement in the assembly to receive and surround the drive shaft. The passage 40 includes a longitudinal axis 42. In the exemplary clutch assembly 10 of FIG. 1 the passage 40 is tapered, with the circumferentially interior taper narrowing in a direction away from the hub 12. As discussed in more detail herein, the taper helps to hold the clutch assembly 10 onto the shaft. The tapered portion 40 of the friction plate 14 prevents movement of the clutch assembly 10 in a first axial direction relative to a correspondingly tapered segment of the drive shaft. The corresponding tapers can remain in fixed contact with each other during operation of the clutch assembly. The entire friction plate 14 can be radially supported on the tapered shaft segment.

The friction plate includes a base flange portion 44 and an arm portion 46. The flange portion 44 forms the passage 40. The arm portion 46 radially extends substantially perpendicular to the flange portion 44. The friction plate 14 also includes holes, bores, or openings 48, each configured for arrangement in the assembly to receive a respective connector member 16. In the exemplary clutch assembly 10, the friction plate 14 includes a plurality of shaft engaging portions capable of imparting rotation to the drive shaft. For example, the friction plate can have male/female portions (e.g., keys) that correspondingly engage with respective female/male portions (e.g., slots) of the drive shaft. In alternative embodiments both the hub and the friction plate (or only the hub) can be structured to engage the shaft for rotation therewith.

Each connector member 16 is sized to simultaneously extend in a hub opening 38 and friction plate opening 48 to connect the hub 12 to the friction plate 14. In the exemplary clutch assembly 10, the connector members comprise screws. During hub to friction plate connection, each threaded screw is engaged with the corresponding threads of aligned bores 38, 48.

In an exemplary arrangement, an annular radial gap remains between the hub bore 34 and the shaft. That is, the hub 12 remains spaced from the shaft during clutch engagement operation. The shaft may be without a step at its tapered and non-tapered shaft segments. Radial support for the hub 12 comes through its connection with the friction plate 14. The hub 12 can be supported by the friction plate 14 via the engagement between the tapered friction plate portion 40 and the tapered shaft segment. The entire clutch assembly 10 can be radially supported by the tapered segment of the shaft. Thus, the tapered shaft segment also supports the piston assembly 22.

The housing 18 is generally cylindrical and is configured for arrangement in the assembly in generally surrounding relation about the hub 12.

The first bearing arrangement 20 comprises at least one bearing assembly. The first bearing arrangement 20 is configured for arrangement in the assembly between the hub 12 and the housing 18. The first bearing arrangement may also be referred to herein as a housing bearing arrangement, which comprises at least one housing bearing assembly. The housing bearing arrangement enables the hub to rotate relative to the housing. In the exemplary clutch assembly 10 the housing bearing arrangement comprises at least one ball bearing, with a plurality of bearing balls annularly positioned about the hub. In the exemplary clutch assembly 10, the housing bearing arrangement 20 is removably fixed between the hub flange 13 and a housing flange 19.

The piston assembly 22 is generally cylindrical and configured for arrangement in the assembly adjacent the housing 18. The piston assembly 22 is arranged for sealing engagement with the housing. The piston assembly includes at least one air or fluid receiving port 50 in (air or fluid) communication with a respective air or fluid passage 52. In the exemplary clutch assembly 10 the piston assembly 22 is air or fluid actuated (or activated) to move axially relative to the housing 18 in sealed relation therewith. The piston assembly 22 can be driven by air and/or liquid, other gas or gases, or a combination of gases and fluids. The piston assembly 22 can operated as a hydraulic piston. The piston assembly 22 includes one or more guide pins 54 for guiding the piston assembly during movement thereof relative to the housing. Each guide pins 54 is slidable in a respective recess or bore 56 of the housing.

The O-rings 24 are configured for arrangement in the assembly between the housing 18 and the piston assembly 22. The O-rings 24 allow the piston assembly 22 to be in sealing engagement with the housing 18. The O-rings are seated in respective circumferential slots or grooves in at least one of the housing and piston assembly. It should be understood that seal types other than O-rings may also be applicable. In the exemplary clutch assembly 10 a piston seal O-ring is sized for positioning in a piston groove 58 and a housing seal O-ring is sized for positioning in a housing groove 59. Thus, the piston seal ring moves along with the piston assembly but the housing seal ring remains stationary with the housing. The air or fluid passage 52 is configured for discharging air or fluid between the O-rings 24, 24. The increase in pressure between the O-rings causes the piston assembly 22 to move in the axial direction toward the friction plate 14. Thus, the piston assembly 22 is operative to be pressure driven by air or fluid in an axial direction relative to the housing 18.

The pressure plate 26 is generally cylindrical and is configured to be arranged in the assembly in mating slidable relationship with the flange portion 44 of the friction plate 14. The pressure plate 26 and the friction plate 14 are mated together (e.g., keyed, splined) to rotate together. The mated pressure plate is also able to move axially relative to the friction plate. FIG. 1 shows the relationship of projections/slots 62 of a pressure plate base flange portion 60 mated with projections/slots 64 of the friction plate flange 44. The pressure plate includes an arm portion 66 radially extending substantially perpendicular to the flange portion 60. The arm portion 66 extends in a direction parallel to the friction plate arm portion 46. The spacing between the pressure plate and the friction plate is substantially the same along the length of a friction disc positioned therebetween. That is, the gap spacing is substantially the same along an elongated distance in the parallel direction (i.e., perpendicular to the longitudinal axis). As described in more detail herein, the pressure plate can be axially moved responsive to activation of the piston assembly.

The second bearing arrangement 28 comprises at least one bearing assembly. The second bearing arrangement 28 is configured for arrangement in the assembly between the piston assembly 22 and the pressure plate 26. The second bearing arrangement may also be referred to herein as a piston bearing arrangement, which comprises at least one piston bearing assembly. The piston bearing arrangement 28 enables the pressure plate 26 to rotate relative to the piston assembly 22. In the exemplary clutch assembly 10 the piston bearing arrangement comprises at least one thrust bearing, with a plurality of bearing balls annularly positioned about the flange portion 60 of the pressure plate 26. In the exemplary clutch assembly 10, the piston bearing arrangement 28 is removably fixed in the radial direction between a piston flange 68 and the pressure plate flange 60. The piston bearing arrangement 28 includes a radially outer portion 70 and a radially inner portion 72. The outer portion 70 can abut an annular lip 74 of the piston assembly 22 for movement therewith during piston assembly activation. The inner portion 72 can be engaged to the pressure plate 26 for rotation therewith via a bearing guide pin 76. The piston bearing arrangement 28 can be arranged in the assembly 10 with axially play between the piston assembly 22 and the pressure plate 26. Alternatively, the piston bearing arrangement can be arranged in the assembly with constant contact with both the piston assembly and the pressure plate. Nevertheless, pneumatic or fluid activation of the piston assembly 22 is operative to cause the piston bearing arrangement 28 and the pressure plate 26 to be axially moved toward the friction plate 14.

The biasing members 30 are each configured for arrangement in the assembly between the pressure plate 26 and the friction plate 14. The biasing members 30 are operative to provide a biasing force against the pressure plate relative to the friction plate. In the exemplary clutch assembly 10 each biasing member comprises a compression spring. Each spring 30 is positioned in a state of compression between and in engagement with both the pressure plate and the friction plate. Thus, each spring 30 is operative to impart a pushing force against the pressure plate in a direction away from the friction plate. As shown in FIG. 1, a friction plate spring seat or aperture 78 and a pressure plate spring seat or aperture 79 can receive respective ends of a compression spring 30. A flange keeper 29 can provide radial support to the spring and maintain the spring ends in the seats 78, 79. The springs are configured so that the pushing force generated is large enough to move the pressure plate in a direction away from the friction plate when the piston assembly is not in an activated condition. The springs are also configured so that the generated pushing force is smaller than the air or fluid force generated to drive the piston assembly. Thus, the springs 30 are configured for operative association relative to the piston assembly configuration, including the diameters of the air or fluid receiving port 50 and the air or fluid passage 52. That is, the size and force of the applicable spring can be dependent on the piston assembly, and vice versa. In the exemplary clutch assembly 10 the length of the spring is greater than the engaged thickness of the friction discs.

The at least one friction disc 32 is configured to be arranged in the assembly between the pressure plate 26 and the friction plate 14. The exemplary clutch assembly 10 comprises two friction discs 32, 32. It should be understood that more or fewer friction discs are possible depending on the application. For example, the use of two friction discs can result in greater torque provided to the drive shaft in comparison to the use of only one friction disc. The friction discs 32 are placed in the assembly so that one is operative to engage the pressure plate and the other is operative to engage the friction plate. The outer circumference of each friction disc is geared to correspond (e.g., a splined relationship) with a drive source (e.g., a splined ring associated with a flywheel). The friction discs 32 can comprise a composite material, including impregnated fiber and/or brass fines and/or powdered metal. A disc separator plate 80 is arranged between the discs 32 in mating slidable relationship with the friction plate flange 44. The disc separator is positioned about the axial flange 44 of the friction plate. The disc separator and friction plate are mated (e.g., keyed, splined) to rotate together. The mated disc separator 80 is also able to move axially relative to the friction plate 14. FIG. 1 shows a projection 82 linking or mating the disc separator 80 to the friction plate flange 44. The friction plate projections 64 can be used in mating with the disc separator projections 82. The disc separator 80 can be cylindrically shaped with openings therein to permit passage of the springs 30 therethrough. As described in more detail herein, the mated disc separator 80 can be axially slid relative to the friction plate 14 responsive to activation of the piston assembly 2.

Figure 2:
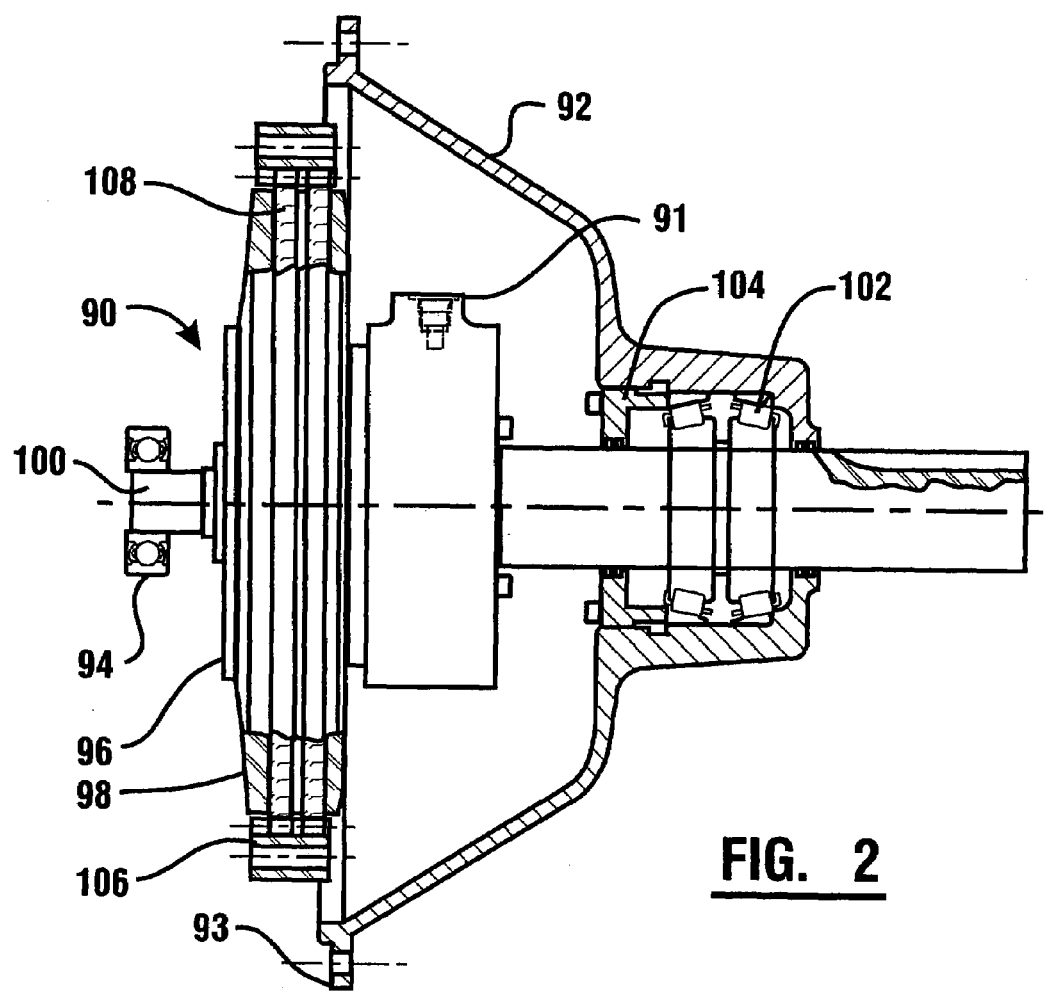
FIG. 2 is a schematic view of a dual disc clutch assembly installed in a Bell Housing.

FIG. 2 shows an exemplary double disc PTO clutch assembly 90 installed in a Bell Housing 92. The operation and components of the clutch assembly 90 are similar to those previously discussed with regard to the clutch assembly 10 of FIG. 1. For example, the clutch assembly 90 includes an air or fluid inlet port 91. The Bell Housing may comprise a Twin Disc Bell Housing style for a PTO clutch. The Bell Housing 92 includes an annular mounting flange 93. A shaft bearing arrangement 94 is engaged to an end of a drive shaft 100 to provide axially alignment or centering of the shaft. The shaft bearing arrangement 94 can be positioned in a supporting device, such as a flywheel. The shaft bearing arrangement 94 also provides rotational stability to the drive shaft. The bearings prevent the drive shaft 100 from rotating with a flywheel. A shaft nut arrangement 96, which may also include a washer, holds the friction plate 98 and the clutch assembly 90 onto the drive shaft 100. As previously discussed, the tapered passage (e.g., passage 40 of a friction plate 98) prevents movement of the clutch assembly 90 in a first axial direction relative to a correspondingly tapered shaft 100. The single nut 96 prevents movement of the clutch assembly 90 in the opposite axial direction relative to the shaft 100. Thus, the clutch assembly 90 can be readily connected/disconnected to a tapered shaft using a single nut 96. The easy-on/easy-off quick release arrangement facilitates the ability to quickly change the clutch assembly or components thereof. The secure connection caused by the nut arrangement 96 also prevents the springs 30 from keeping the friction plate 14 away from the friction discs 32 during actuation of the piston 22. That is, with the clutch assembly 90 securely fastened to the shaft 100, the friction plate 98 is prevented from moving axially.

The drive shaft can be positioned and supported in the Bell Housing by another bearing arrangement 102. In an exemplary form of the invention the bearing arrangement 102 comprises Timken bearings or deep groove ball bearings. The Timken bearings 102 and the bearing arrangement support 104 are mounted in the Bell Housing 92. The bearings 102 are angled with respect to each other to prevent movement of the drive shaft 100 in both axial directions relative to the Bell Housing. Also shown is a drive gear ring 106 which may be attached to the flywheel. The ring 106 can have interior splines for mating engagement with the friction discs 108 which are likewise correspondingly circumferentially splined or geared.

Figure 3:
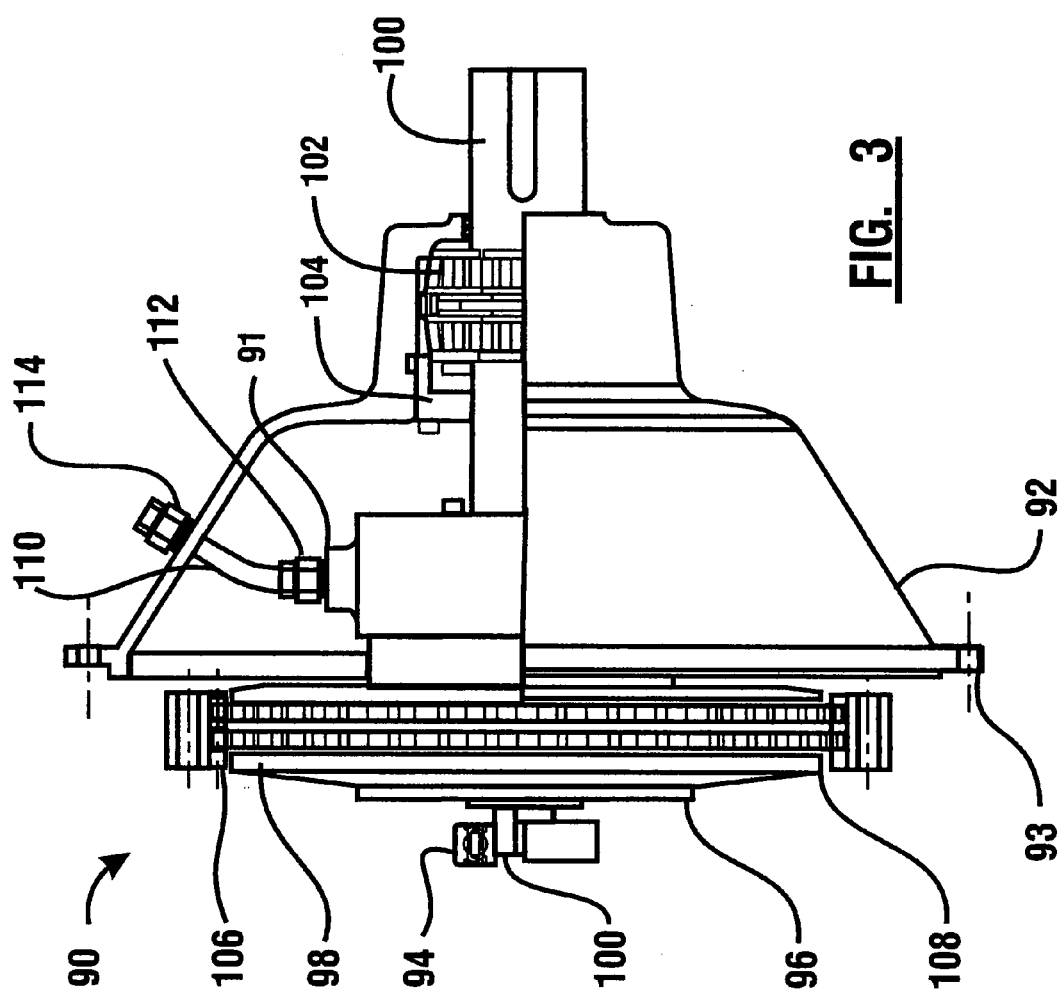
FIG. 3 is a partial cut away detailed view of the clutch assembly of FIG. 2.

FIG. 3 shows a partial cut away detailed view of the clutch assembly arrangement 90 of FIG. 2. Also shown is an air or fluid actuation line 110 fastened to the injection port 91 by a nut 112. The actuation line 110 may be flexible to permit bending with movement of the piston. The actuation line extends through the Bell Housing 92 and is fastened thereto by another nut 114.

In operation the piston assembly is axially driven toward the friction plate responsive to a predetermined pressure level be reached between the piston assembly and the housing due to the input of air or fluid into the air or fluid inlet port. Axial movement of the piston assembly acts to cause axial movement of the piston bearing arrangement. Axial movement of the piston bearing arrangement acts to cause axial movement of the pressure plate. Axial movement of the pressure plate acts to cause slipping abutment with the first (closest) rotating friction disc resulting in axial movement of the friction disc. Axial movement of the first friction disc acts to cause slipping abutment with the disc separator resulting in axial movement of the disc separator. Axial movement of the disc separator acts to cause axial movement of the second (furthest) rotation friction disc. Axial movement of the second friction disc acts to cause engagement with the friction plate. Thereafter, with no further axial movement permitted, the pressure plate, first friction disc, disc separator, second friction disc, and friction plate are positively frictionally engaged (e.g., compressed together) to rotate as a single unit. Thus, the clutch assembly, upon activation of the piston assembly, can translate rotation from the friction discs to a drive shaft extending along the longitudinal axis.

Figure 4:
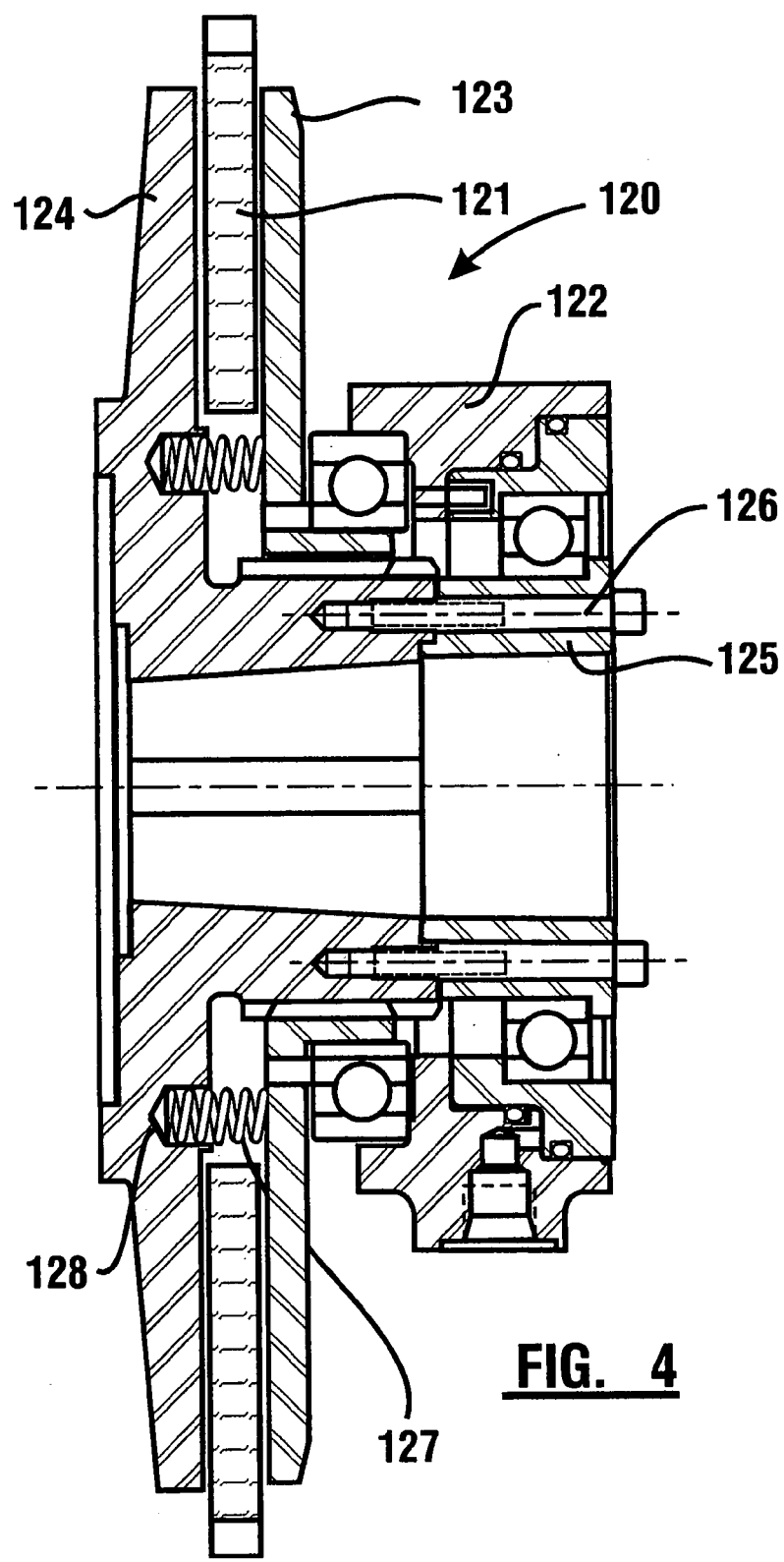
FIG. 4 is a cross-sectional view of a single disc clutch assembly.

FIG. 4 shows an exemplary PTO clutch assembly 120 comprising a single friction disc 121. The clutch assembly 120 operates in the same manner as the clutch assembly 10 of FIG. 1. The clutch assembly 120 has mostly the same clutch components as the clutch assembly 10, except for the single disc arrangement instead of the dual disc/disc separator arrangement. However, with use of a sole friction disc some of the components can be of a different (e.g., smaller) size. For example, the clutch assembly 120 can use an axially shorter piston assembly 122 because less travel distance is required to bring about positive (full) rotational translation to the drive shaft with only a single friction disc 121 between the pressure plate 123 and friction plate 124. Correspondingly, a shorter hub 125 and screws 126 can be used. Likewise, shorter compression springs 127 can be used because of the smaller axial gap between the pressure plate 123 and friction plate 124. Also, because of the shorter spring length, spring stability can be managed without both the friction plate and the pressure plate having aligned spring recesses. That is, a shorter spring 127 can be supported in only a single spring recess 128. The single recesses can all be in either the friction plate or the pressure plate, or in a combination of both plates.

Figure 5:
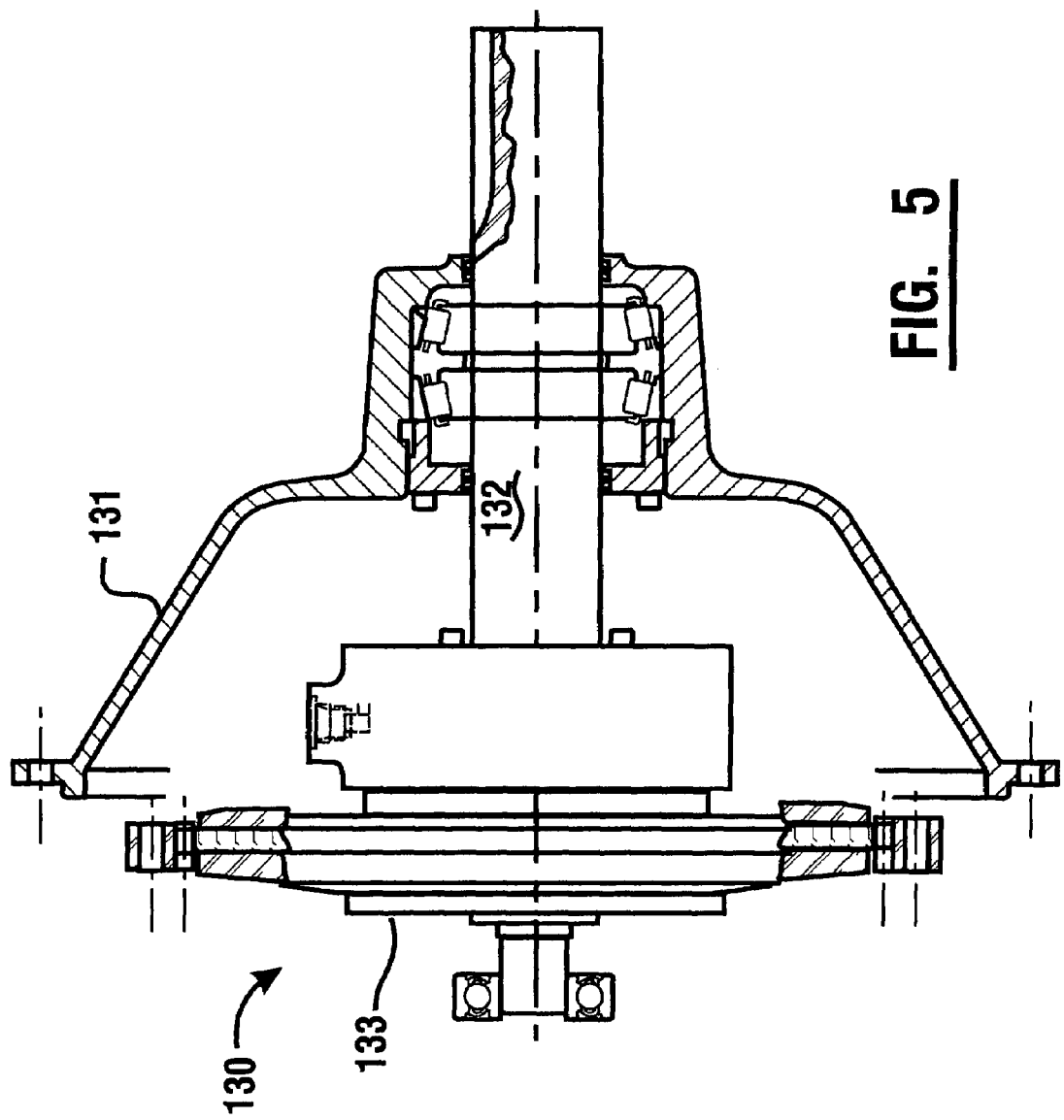
FIG. 5 is a schematic view of a single disc clutch assembly installed in a Bell Housing.

FIG. 5 shows an exemplary single disc PTO clutch assembly 130 installed in a bell Housing 131. The clutch assembly 130 operates in the same manner as the clutch assembly 120 of FIG. 4. The drive shaft 132 and Bell Housing 131 can have the same configuration and be connected in the same manner as previously discussed with regard to FIG. 2. Again, a single nut 133 can hold the clutch assembly 130 onto the drive shaft 132.

In order exemplary clutch assembly arrangements the screws fastening the friction plate to the hub can be inserted and removed from the friction plate side instead of the hub side. A tap bore can extend through the friction plate to align with a bore extending partly into the hub. The shaft nut/washer can be arranged to cover the bore in the friction plate. Thus, in this screw arrangement the removal of the shaft nut would grant access to the friction plate screw(s). Removal of the friction plate screws permits the friction disc (along with the friction plate and springs) to be removed without disturbing the other assembly components arranged on the shaft. Thus, the friction discs and springs can be readily and efficiently accessed and replaced.

Figure 7:
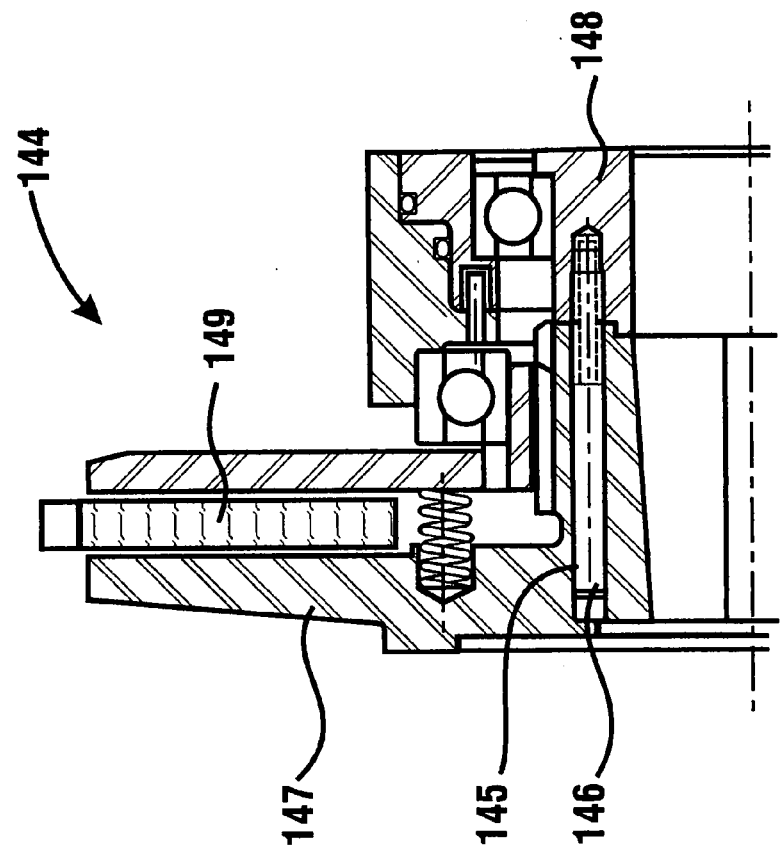
FIG. 7 shows an alternative clutch assembly screw arrangement.
Figure 6:
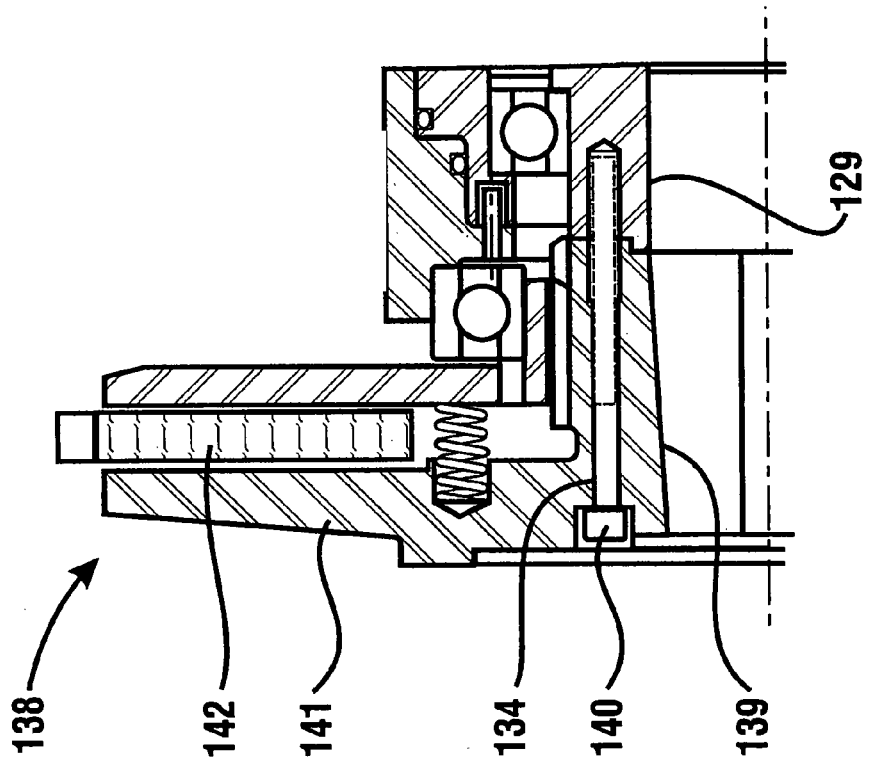
FIG. 6 shows a screw arrangement in a clutch assembly portion.

FIGS. 6 and 7 show such exemplary arrangements of connector members 134, 146 (e.g., screw). For reasons of brevity only clutch assembly portions 138, 144 have been shown in FIGS. 6 and 7. The portions are taken from clutch assemblies having similar structure and operation to the clutch assembly of FIG. 4 except for the positioning of the screws that fasten the friction plate and hub to each other. The arrangement permits the screws to be inserted and removed from a bore extending through the friction plate. That is, the screw arrangement enables the screws to be accessed from the friction plate side of the clutch assembly, instead of the hub side. A friction disc can be replaced without removing the hub from the shaft.

FIG. 6 shows a clutch assembly portion 138 having a bore 139, screw 134 with a head flange 140, friction plate 141, hub 129, and friction disc 142.

FIG. 7 shows a clutch assembly portion 144 having a bore 145, screw 146, friction plate 147, hub 148, and friction disc 149. The screw 146 can be headless. It should be understood that the screw arrangements shown in FIGS. 6 and 7 are likewise applicable with a clutch assembly having plural friction discs, such as the clutch assembly of FIG. 1.

Figure 8:
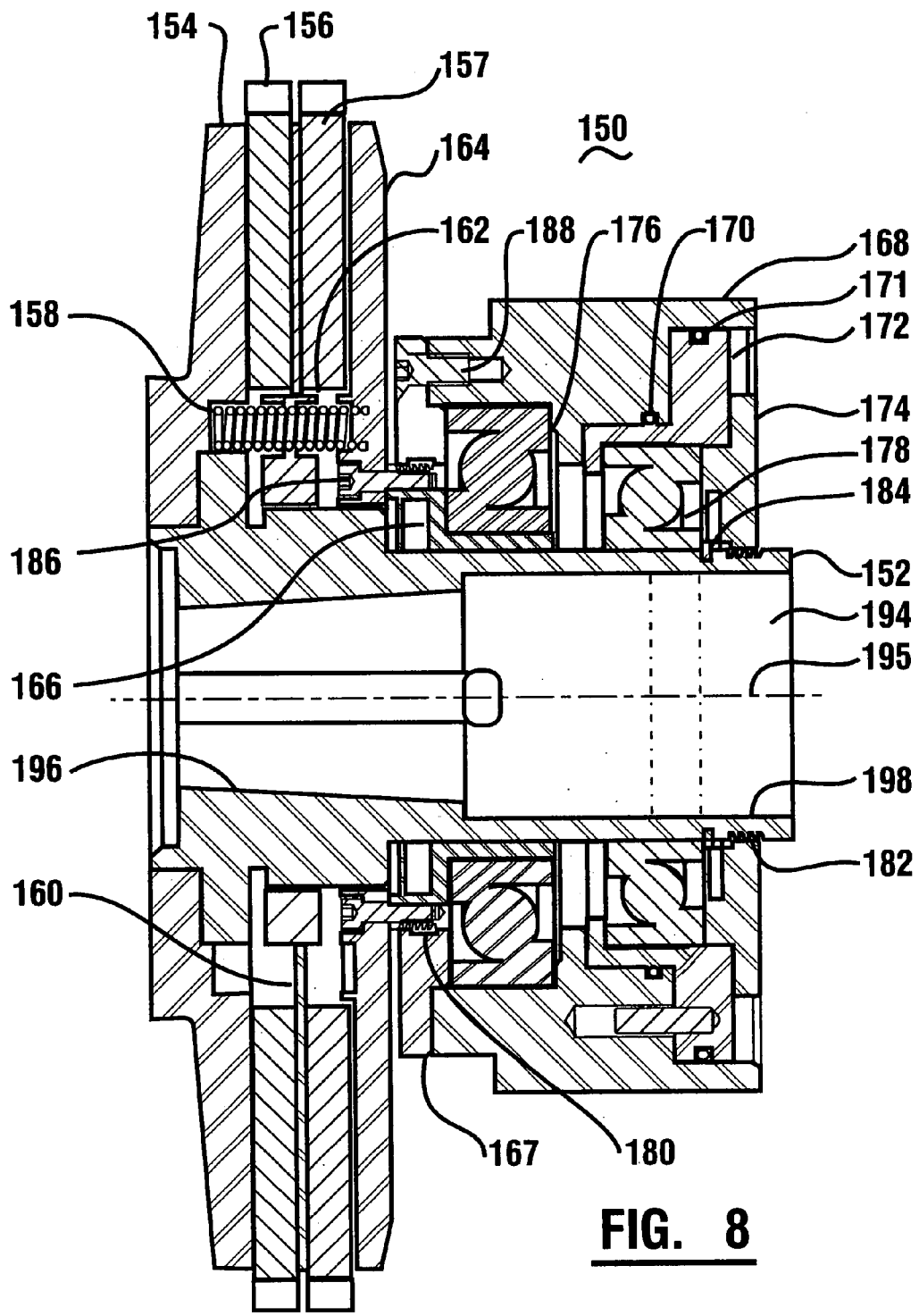
FIG. 8 shows a cross-sectional view taken along section A—A of FIG. 9.
Figure 9:
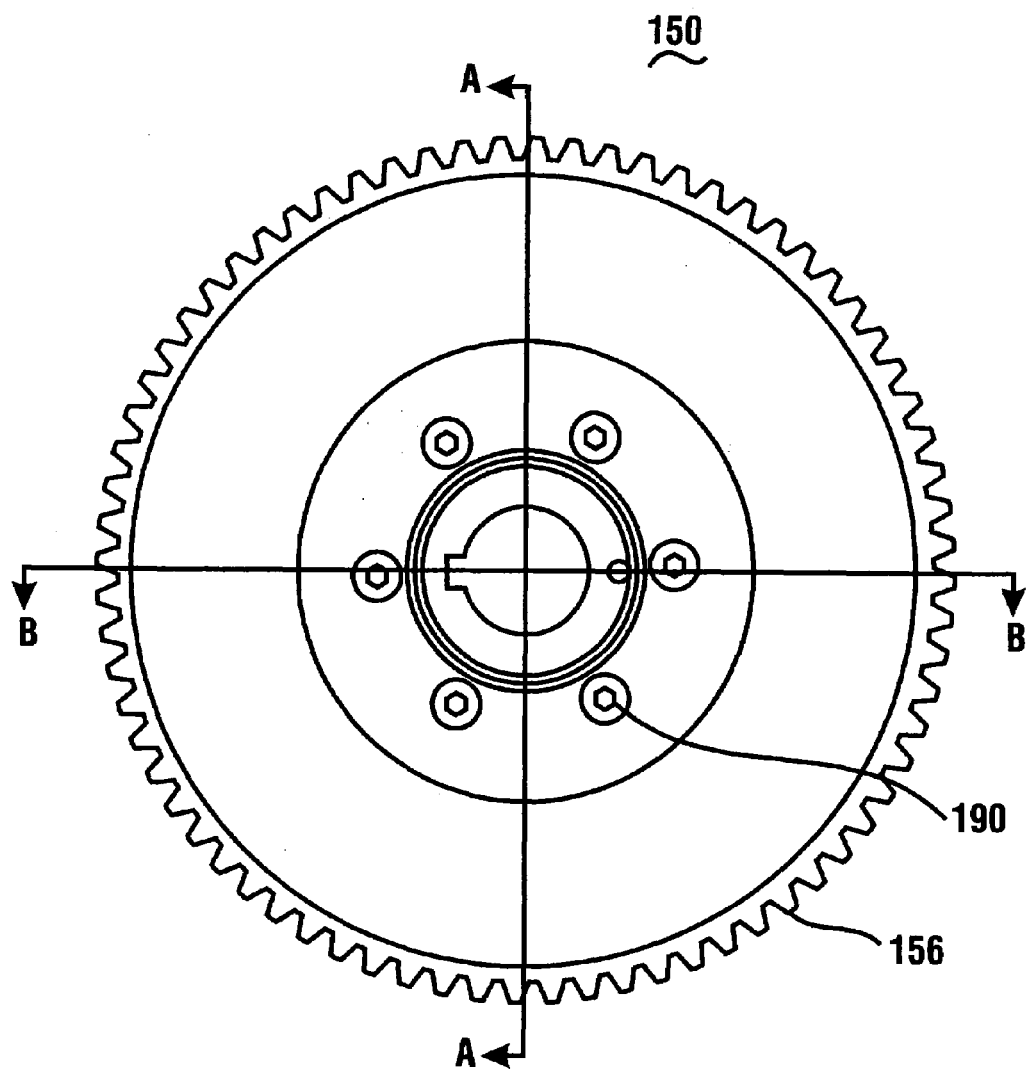
FIG. 9 shows an alternative dual disc clutch assembly.
Figure 10:
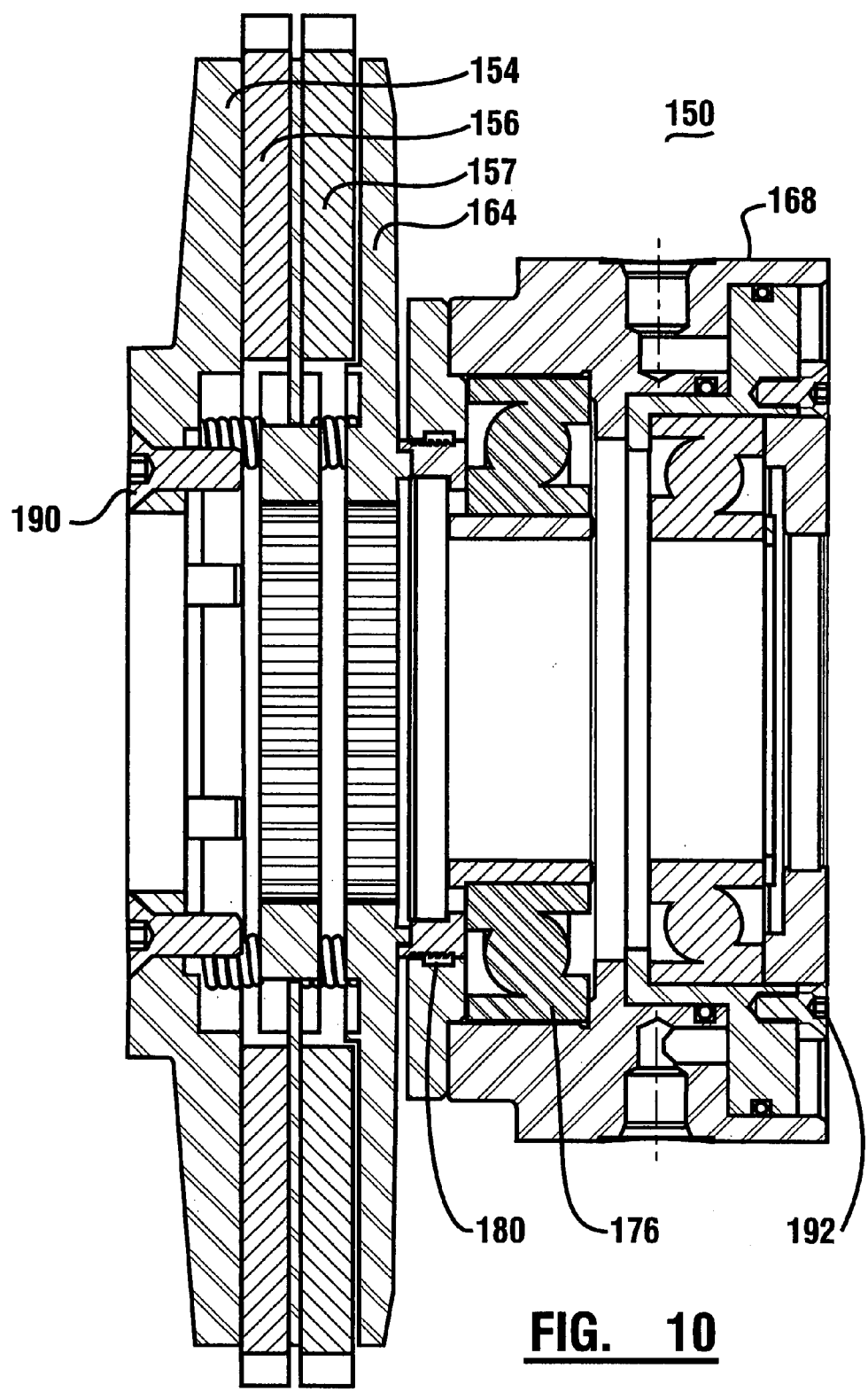
FIG. 10 shows a cross-sectional view taken along section B—B of FIG. 9.

FIGS. 8–10 shows views of an alternative dual disc clutch assembly 150. FIG. 8 is a cross-sectional view taken along section A—A of FIG. 9. FIG. 9 shows a side view. FIG. 10 is a cross-sectional view taken along section B—B of FIG. 9.

The alternative clutch assembly 150 can likewise be used in a PTO operation with a Bell Housing. The clutch assembly components can operate in manners similar to previously discussed similar components. As previously discussed, an existing Bell Housing can be retrofit with the PTO clutch assembly. Certain removed existing components (e.g., shaft) may be reused.

FIG. 8 shows particular components of the clutch assembly 150, including a hub 152, friction plate 154 (which may also be referred to herein as a backplate), friction discs 156, 157, compression spring 158, disc separator 160, disc separator projections 162, pressure plate 164, spacers 166, 167, piston assembly 168, O-rings 170, 171, cylinder assembly 172, spacer 174, angular contact bearings 176, 178, labyrinth seals 180, 182, snap ring 184, and fasteners 186, 188. FIG. 9 shows additional fasteners 190. FIG. 10 shows additional fasteners 192.

The general operations of labyrinth seals and angular contact bearings are known, and need not be discussed further. However, in the novel clutch assembly 150, the angular contact bearings 176, 178 enable high torque performance while the labyrinth seals 180, 182 assist in the reduction or elimination of heat.

As shown in FIG. 8, the hub 152 includes a bore 194. The bore is configured to receive a shaft. The longitudinal axis of the shaft can align with the bore axis 195. The bore 194 includes a tapered portion 196 and a non-tapered portion 198. The shaft likewise can include a tapered segment and a non-tapered segment. In a manner previously discussed, the non-tapered bore portion 198 can remain radially spaced from the non-tapered shaft segment during clutch engagement. This spacing enables the hub 152 to be radially supported solely (via the tapered bore portion 196) by the tapered shaft segment. The hub 152 can support the entire clutch assembly 150. Thus, the entire clutch assembly 150 can be radially supported by the tapered shaft segment. It follows that the friction plate 154 and the piston assembly 168 can be likewise supported (via the hub 152) at the tapered shaft segment.

Operation of the clutch assembly 150 can be ascertained from FIG. 8. Activation (e.g., pneumatic or fluid) of the piston assembly 168 is operative to cause the pressure plate 164 to move axially toward the friction plate 154. The friction discs 156 can be driven by an engine via a drive gear ring (e.g., ring 106), such driving operation being well known. Engagement of the friction plate 154 and the pressure plate 164 with the respective friction discs 156, 157 imparts rotation to the clutch (and its hub 152). The hub 152 and the shaft are correspondingly radially connected with each other via male/female portions, keys/slots, or splines/grooves. Thus, rotation of the hub 152 imparts rotation to the shaft. As is well known, shaft rotation can be used to drive one or more devices, such as a work tool.

In a manner previously discussed (e.g., nut arrangement 96), the clutch assembly 150 can be securely attached to the shaft by a nut arrangement. The nut arrangement prevents movement of the clutch assembly 150 relative to the shaft in a first axial direction. The corresponding hub taper and shaft taper engagement prevents movement of the clutch assembly 150 relative to the shaft in an opposite axial direction. Thus, the hub 152 can be radially and axially supported by the tapered shaft segment.

With the clutch assembly 150, the friction discs 156, 157 can be replaced without requiring removal of the nut arrangement. As seen in FIGS. 8 and 10, the friction plate 154 is connected to the hub 152 by fasteners 190. Removal of the fasteners 190 enable the friction plate 154 to be removed from the clutch assembly 150. Removal of the friction plate 154 permits direct access to the friction discs 156, 157. As further seen in FIGS. 8 and 10, at the disc end portion of the clutch assembly 150 the inner diameter of a friction disc 156 is greater than the outer diameter of the hub 152. Thus, the friction discs 156, 157 can be removed by axially moving them away from the hub 152 while the hub is still connected to the shaft. Thus, the clutch assembly 150 includes an easily removable friction plate 154 for quick access to the friction discs 156, 157.

Figure 11:
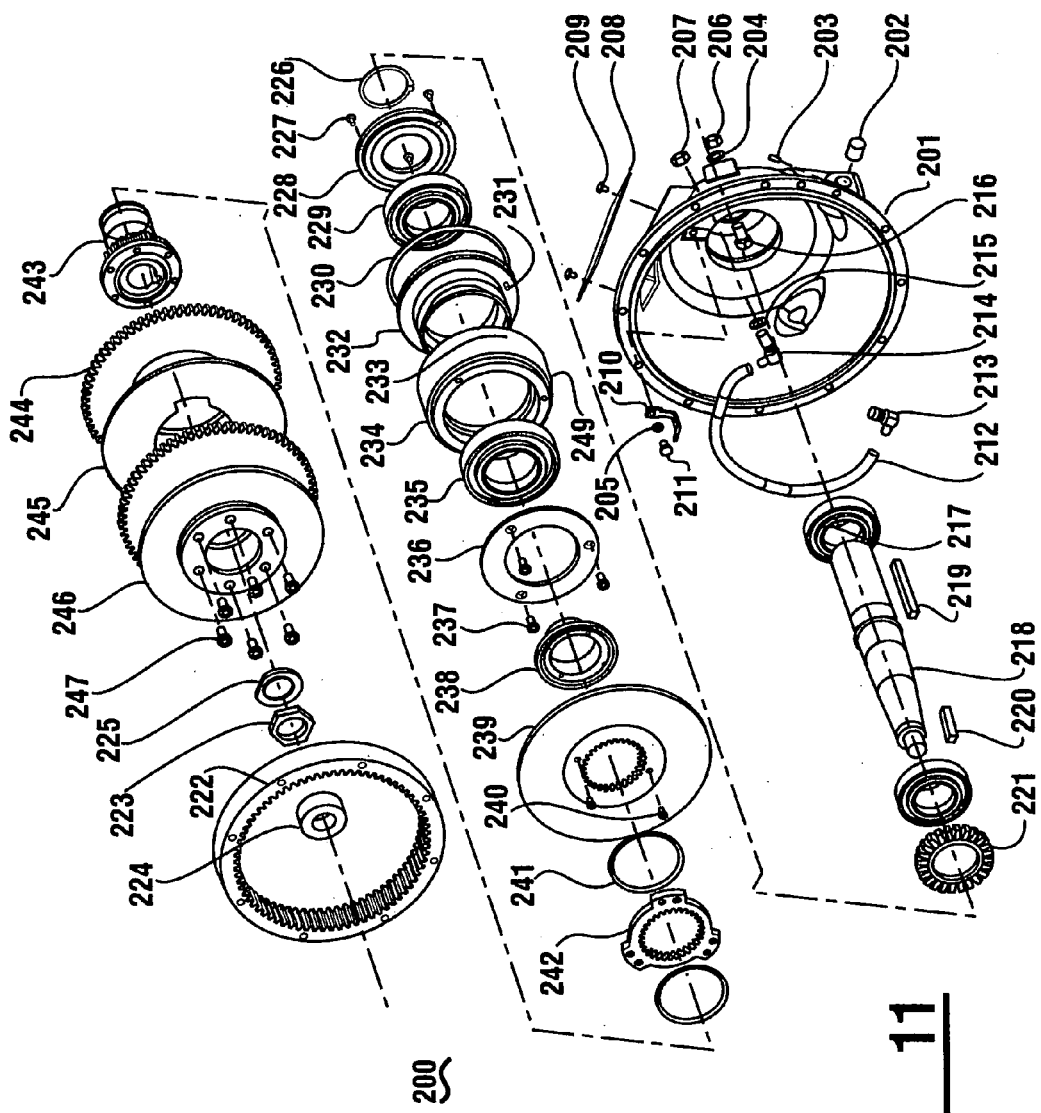
FIG. 11 shows an exploded view of components of an exemplary Bell Housing arrangement.

FIG. 11 shows an exploded view of components of an exemplary Bell Housing arrangement 200 that includes a further exemplary PTO clutch assembly of the present invention. The exemplary arrangement 200 includes a Bell housing 201, stopper plug 202, set screw 203, lock washers 204, 205, nuts 206, 207, name plate 208, pan head screw 209, anti-rotation bracket 210, hex bolt 211, hose assembly 212, swivel elbow 213, bulkhead fitting 214, washer 215, hex bolt 216, tapered roller bearing 217, shaft 218, shaft key 291, hub key 220, and bearing nut 221. The arrangement 200 further includes a drive ring 222, lock nut 223, shaft bearing 224, and lock washer 225. The arrangement 200 further includes a retaining ring 226, fasteners 227, spacer 228, angular contact bearing 229, O-ring 230, dowel pin 231, cylinder 232, O-ring 233, piston assembly 234, angular contact bearing 235, spacer 236, fastener 237, spacer 238, pressure plate 239, fastener 240, wave spring 241, separator 242, hub 243, (twin) friction discs 244, separator disc 245, backplate 246, and fasteners 247. A biasing member (e.g., spring) can be used to generate a separating force between the pressure plate 239 and the backplate 246 in a manner previously discussed.

An exemplary clutch assembly can comprise components 226–247. The clutch assembly components 226–247 may be grouped or packaged together to form a clutch assembly kit.

The anti-rotation bracket 210 can prevent the piston assembly 234 from rotating. The anti-rotation bracket 210 can be attached to the housing 201. A portion of the bracket 210 can mate with a slot 249 in an outer circumferential edge of the piston assembly 234. In FIG. 11 the slot 249 can be seen at the bottom of the piston assembly 234.

The swivel elbow 213 enables the use of a rigid hose 212. In an exemplary hose assembly arrangement, one end of the hose 212 is fitted to the bulkhead 214 at a first (top) position. The other end of the hose 212 is fitted to the piston assembly 234 at a second (bottom) position. The positioning and length of the hose 212 enables the piston 234 to move axially without bending or tangling the rigid hose.

Figure 12:
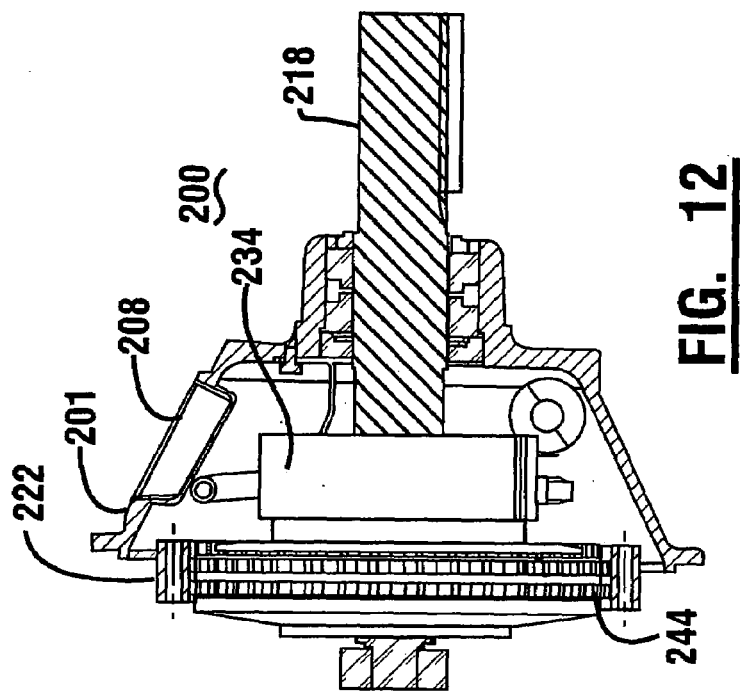
FIG. 12 shows the assembled components of FIG. 11.

FIG. 12 shows the assembled arrangement 200. For clarity, only a few of the components in FIG. 12 have been references, such as the housing 201, name plate 208, shaft 218, drive ring 222, piston assembly 234, and friction disc 244.

Figure 13:
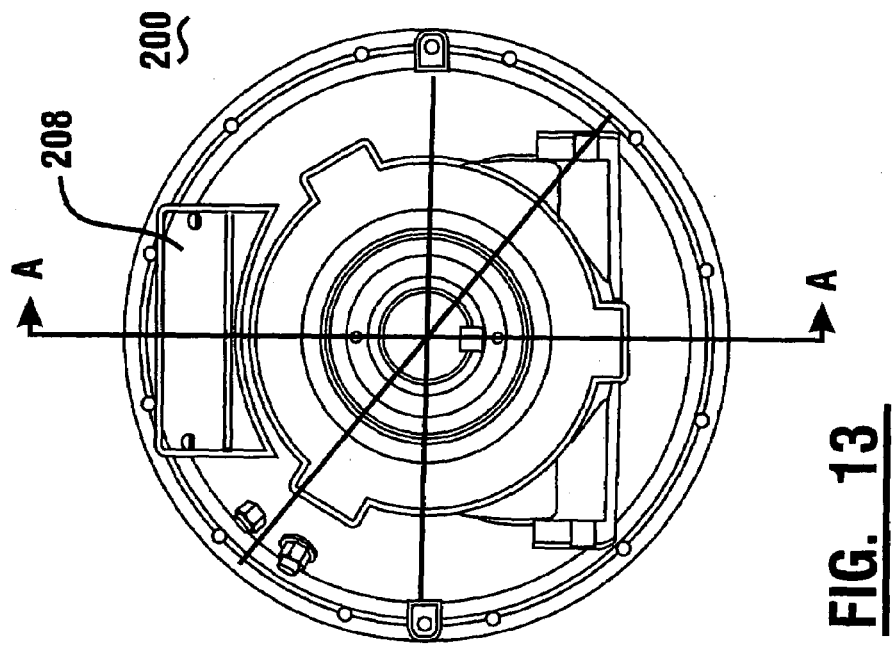
FIG. 13 shows a side view of the assembled arrangement of FIG. 12.

FIG. 13 shows a side view of the assembled arrangement 200. The name plate 208 on the housing 201 can be readily seen in FIG. 13. FIG. 12 is taken along A—A of FIG. 13.

Figure 14:
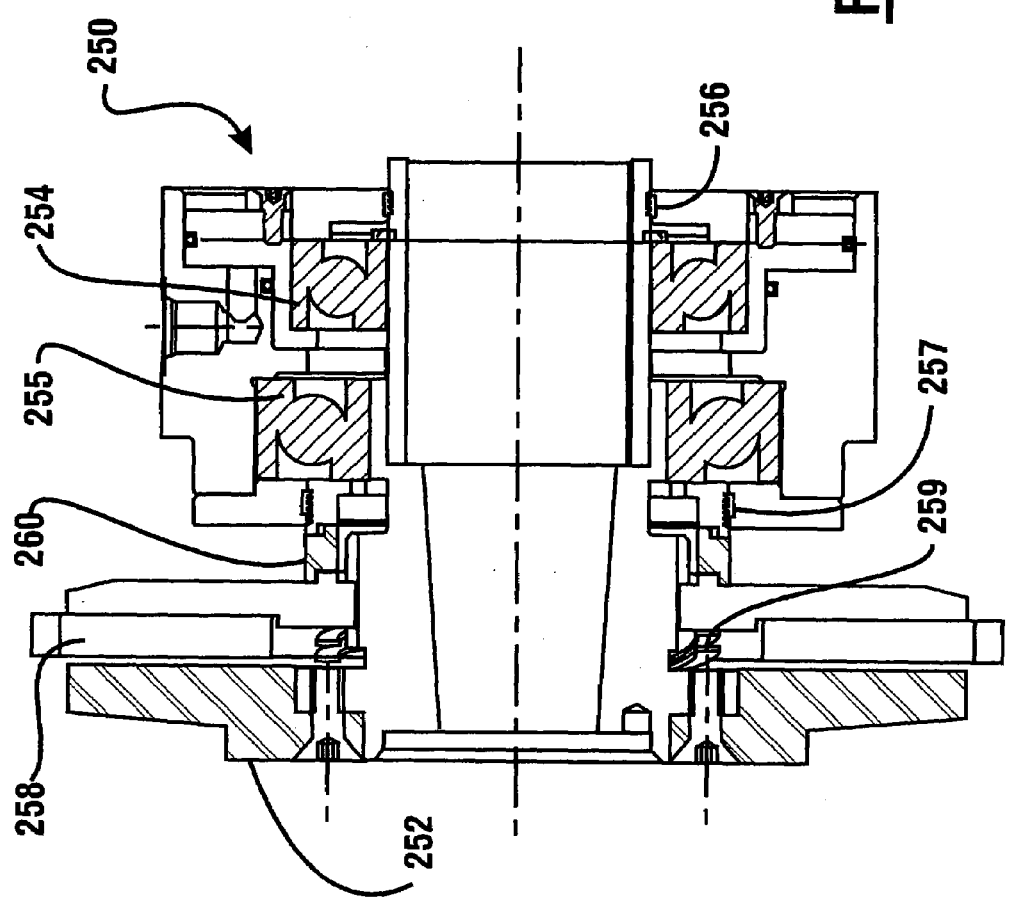
FIG. 14 shows an exemplary clutch assembly.

FIG. 14 shows another exemplary clutch assembly 250. The clutch assembly 250 is similar to the clutch assembly shown in the assembled arrangement 200. The clutch assembly 250 includes a removable backplate 252, angular contact bearings 254, 255, labyrinth seals 256, 257, and biasing member 259 (e.g., spring). However, instead of the previously discussed twin friction discs of the clutch assembly in assembled 200, the clutch assembly 250 has only a single friction disc 258. A spacer 260 is used to fill the axial void (distance) caused by a removed friction disc (and a separator disc). The spacer 260 can be chosen from among a plurality of spacers of various axial lengths to ensure spacing accuracy. The use of a spacer enables the same clutch assembly 250 to be used with one or more friction discs.

In a further exemplary clutch assembly installation process, friction discs can be aligned with each other prior to their installation about the shaft. The friction discs and the separator disc can each have one or more (axially extending) alignment holes therethrough. Each alignment hole is configured to receive an alignment pin therethrough. An alignment pin can extend through several aligned holes to maintain the friction discs in alignment during their installation. The alignment pins may be removed after the drive ring has been properly installed. The holes may have a radial female slot through which a radial male key at an end of an alignment pin can pass. After the key has passed through the holes, it can then be turned to provide engagement with the innermost side of a friction disc.

FIG. 15 shows an alignment pin or rod 270 that can extend through aligned holes 272 in a first friction disc 274, a separator disc 276, and a second friction disc 278.

An exemplary clutch assembly of the present invention enables a reduction in torsional vibration. A drive gear ring (e.g., ring 106, 222) can be fitted with a resilient, flexible material adjacent the gear teeth. The resilient material can comprise a moldable liner that is placed intermediate the gear ring and the friction discs (e.g., 156, 157; 244). The liner can act as a vibration damper. The anti-vibration liner can be pliable so as to fill the gaps adjacent the gear teeth and the friction discs to reduce vibration. The resilient material may comprise a gel, paste, film, rubber, elastomeric, polymer, and/or plastic substance or material. The material can be applied to both the gear ring and the friction discs. The material may also comprise a hard slippery coating or composite which promotes slidability and/or reduces wear between the teeth. Turcite material may be used.

The liner can be a unitary member (e.g., a boot ring) that includes plural moldable items therein, such as plastic balls. The liner can be cut to ensure proper fitting. The unitary member can be handled as a single unit. Alternatively, the liner may be applied non unitary. For example, the liner may be sprayed or coated onto the gear teeth (or the friction discs) as a plurality of separate substances or as a fluid. Later, the substances or fluid may harden to form a single anti-vibration unit.

FIG. 16 shows a moldable annular liner 280. The liner 280 can be positioned adjacent to teeth prior to a gear ring and friction disc engagement. FIG. 17 shows a liner 281 located over the teeth 284 of a friction disc 282. FIG. 18 shows a liner 285 located inside of a drive gear ring 286, adjacent the drive gear teeth 288. Engagement between a gear ring 286 and a friction disc 282 allows a liner to be compressed and evenly dispersed between the engaging teeth 284, 288.

An annular liner may be placed into position as a ring. Alternatively, one or more strips of liner may be cut from a roll of liner. During liner installation, the liner can conform to the shape of gaps between (gear ring or friction disc) teeth. The teeth can be used to initially hold the liner in position until engagement occurs between the gear ring and friction disc.

In other installation arrangements the liner may include a self-adhesive backing. A self-adhesive backing may be used that temporarily adheres a liner strip adjacent to the teeth. The self-adhesive backing may be covered with peel-off paper. The adhesive feature of the backing can be time and/or heat sensitive. For example, after a predetermined time or temperature, the backing loses its ability to connect the liner to the teeth. The adhesive feature allows ample time for installation of the gear ring and friction disc. After assembly of the gear ring and friction disc the engaged teeth hold the liner in position, and the adhesive feature is no longer needed.

The exemplary clutches described herein can each be used in an exemplary clutch control process with regard to machine operation. Diagnostic monitoring can be used in conjunction with an exemplary clutch to prevent stalling of an engine and/or damage to machine components. The monitoring arrangement includes a controller having one or more sensor devices in operative connection with at least one microprocessor. The controller can also be in operative connection with a jog/run switch, a start button, and a stop button.

Figure 19:
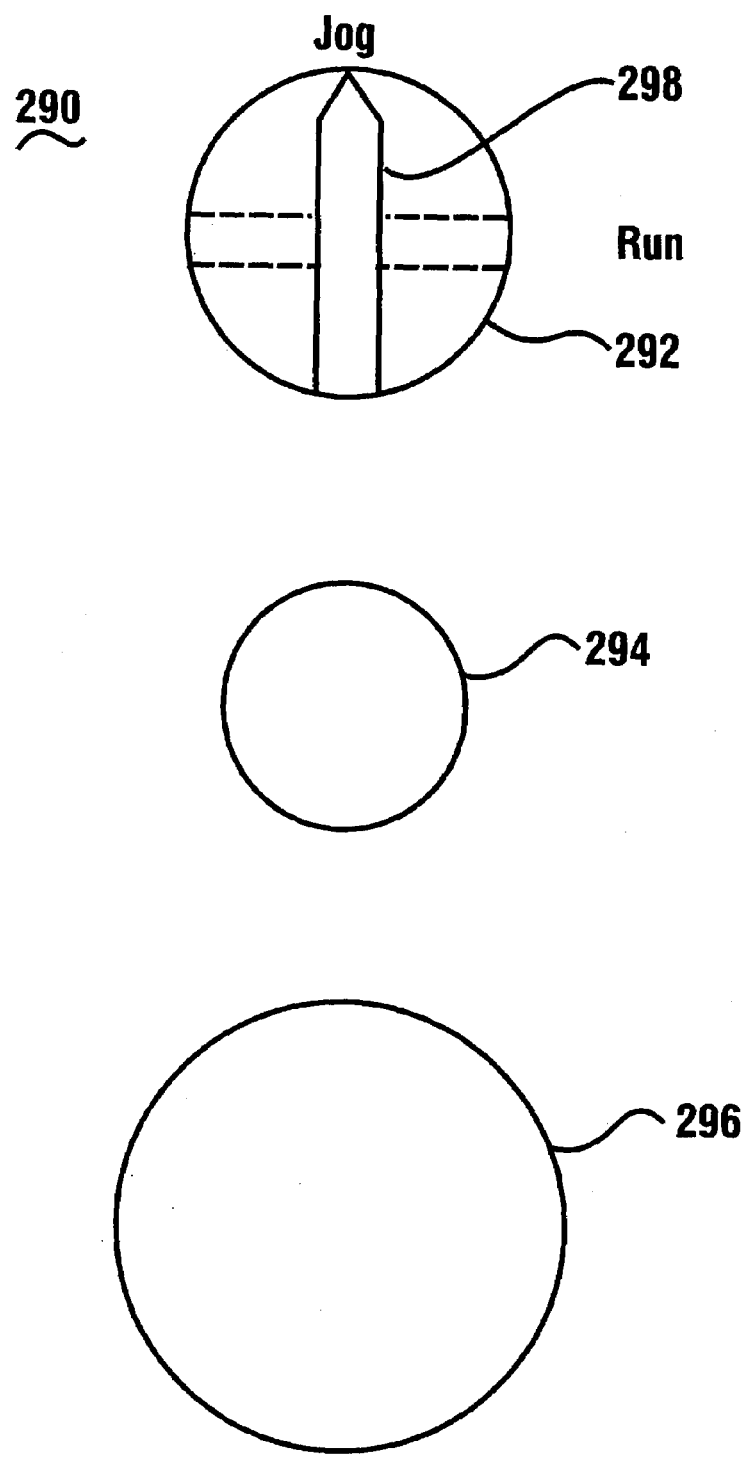
FIG. 19 shows a machine control panel portion.

FIG. 19 shows an area of a machine control panel 290 that includes a jog/run switch 292, a start button 294, and a stop button 296. The stop button 296 can be used by the machine operator to disengage the clutch and/or stop the drive engine. A lever 298 on the jog/run switch 292 can be positioned (e.g., rotated while depressed) to dictate the operational mode of the clutch. Alternative forms of jog/run switches may be used, including a two-way flip switch.

Figure 20:
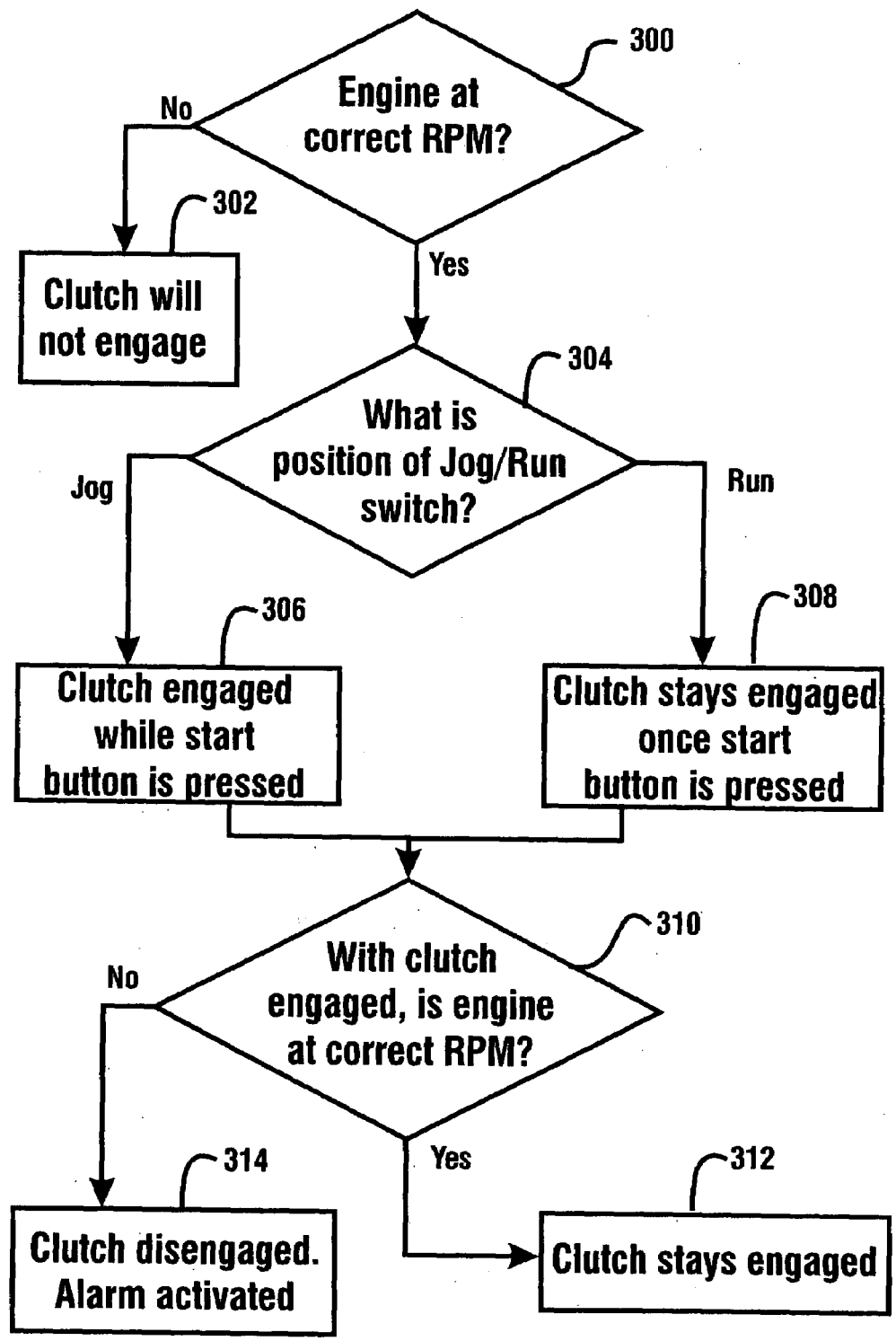
FIG. 20 shows a clutch control monitoring process.

FIG. 20 shows a flow chart of steps involving an exemplary clutch control sequence. At startup, at least one sensor can be used to measure engine speed. If the controller determines 300 that the engine speed is at or above a predetermined RPM, then the clutch can be engaged. Otherwise, the clutch will not engage. Box 302 represents that the clutch cannot be placed in engagement as a result of the "No" determination at decision 300. The RPM setting can be adjusted.

The microprocessor can use at least one sensor to determine 304 the position of the jog/run switch. Depending on the position of the jog/run switch, the operational mode of the clutch will be either the jog mode or the run mode. In jog mode the clutch is only engaged while the start button is being manually pressed. Box 306 represents the clutch being engaged in jog mode. In run mode the clutch becomes engaged and stays engaged after the start button is manually pressed at least once 308. Box 308 represents the clutch being engaged in run mode.

The microprocessor can use at least one sensor to determine whether the clutch is engaged. While the clutch is engaged, the diagnostics can again check 310 the engine RPM. If the engine speed is acceptable, then clutch engagement is maintained. Box 312 represents that clutch engagement is continued as a result of the "Yes" determination at decision 310. Otherwise, the clutch is disengaged. Box 314 represents that clutch engagement is discontinued as a result of the "No" determination at decision 310. The microprocessor can cause an alarm to be activated responsive to the condition. The alarm may be visual and/or audible. For example, a warning light may be tripped to begin flashing.

While the clutch remains engaged during machine operation, the engine RPM can be repeatedly checked 310. An RPM check can occur after a predetermined time period. The time period can be adjusted. The rechecking can be used by the microprocessor to respond to the shaft being bogged down. Such an event would cause the clutch to be automatically disengaged and the alarm to be tripped. The automatic disengagement can prevent damage to the machine. An operator may then shut down the machine.

In alternative monitoring arrangements, while the clutch remains engaged during machine operation, the rotational speed of the shaft can be repeatedly checked instead of (or in combination with) the engine RPM.

Thus, the exemplary monitoring arrangement can prevent engine stall. Likewise, damage to the machine and the clutch can be prevented. The clutch monitoring arrangement also enables monitoring in both jog condition and run condition.

An exemplary PTO clutch assembly of the present invention can be factory or field retrofitted to replace a new or existing Twin Disc Bell Housing style PTO clutch. The exemplary PTO clutch assembly permits ready replacement. In a retrofit operation, the mechanical linkage components associated with an existing clutch assembly arrangement can be removed and replaced by the exemplary PTO clutch assembly. Certain removed components of the existing Bell Housing style PTO clutch arrangement may be reused, such as the Bell Housing, drive shaft, shaft nut/washer, friction discs, and splined flywheel ring.

Additionally, replacement part kits can contain one or more components of an exemplary PTO clutch assembly of the present invention. In an exemplary part replacement operation (e.g., changing a friction disc) the assembly can be disassembled to the extent necessary to permit replacement of the particular part(s). The shaft nut can be removed. Removal of the friction plate permits access to the friction disc(s) and springs for removal without disturbing the other assembled clutch components arranged on the shaft. Thus, the friction discs and springs can be readily and efficiently accessed and replaced. Other fastening screws can be removed, permitting other components to be accessed and removed/replaced. Alternatively, the entire clutch assembly can first be removed as a unit from the drive shaft and Bell Housing for later selective disassembly.

Exemplary forms of the novel clutch assembly apparatus have a self-adjusting disc pack to minimize slippage. Furthermore, mechanical linkages, hand levers, and yokes can be eliminated. The clutch assembly allows for remote actuation. The clutch can be air or fluid actuated to enhance applications requiring cold start. The quick release arrangement of the clutch assembly with respect to a drive shaft enables fast engagement thereto and disengagement therefrom. Thus, replacement of a clutch assembly component (or the entire assembly) can be carried out in a more efficient manner. Additionally, the novel clutch assembly arrangement enables existing clutch assemblies (or parts of the novel clutch assembly) to be replaced in the field to reduce down time. The novel clutch assembly can be used to provide a benefit in both pressure and torque capacity over existing mechanical PTO units.

It should be understood that an exemplary form of the novel clutch assembly is a self adjusting clutch. No mechanical adjustment is needed. The piston assembly can be axially driven to automatically compensate for any wear in a friction disc.

Exemplary forms of the novel clutch assembly apparatus can be used to retrofit a plurality of PTO clutches, including model types SAE 2, SAE 3, SAE 4, and SAE 5. Particular examples of clutch models that can be replaced by a respective exemplary clutch assembly of the present invention include (but are not limited to) Single Disc 890-0058-SAE 3PTO, Twin Disc 890-0059-SAE 3PTO, and Twin Disc Mechanical PTO Clutch # SP 111 and SP211. The novel clutch assembly apparatus allows retrofit with existing Bell Housings. An exemplary clutch assembly can be used with chipper devices or grinder devices. An exemplary clutch assembly can be used with devices requiring high torque operation during the (cutting) disposal of material (e.g., wood or metal).

Thus, the novel clutch assembly apparatus of the exemplary forms of the present invention achieves at least one of the above stated objectives, eliminates difficulties encountered in the use of prior devices and systems, solves problems, and attains the desirable results described herein.

In the foregoing description, certain terms have been used for brevity, clarity, and understanding. However, no unnecessary limitations are to be implied therefrom because such terms are for descriptive purposes and are intended to be broadly construed. Moreover, the descriptions and illustrations herein are by way of examples and the invention is not limited to the details shown and described.

In the following claims, any feature described as a means for performing a function shall be construed as encompassing any means capable of performing the recited function, and shall not be limited to the particular means used for performing the function in the foregoing description, or mere equivalents.

Having described the features, discoveries and principles of the invention, the manner in which it is constructed and operated and the advantages and useful results attained, the new and useful structures, devices, elements, arrangements, parts, combinations, systems, equipment, operations, methods, processes, and relationships are set forth in the appended claims.

The invention claimed is:

1. Apparatus including:
a clutch assembly arrangement, comprising:
   a rotatable cylindrical friction plate,
   a rotatable support member including a passage,
   wherein the passage includes a longitudinal axis,
      wherein at least a portion of the passage is bounded by an axially extending tapered interior surface,
      wherein the tapered interior surface is configured for mating engagement with a corresponding axially extending tapered outer shaft surface of a rotatable shaft,
      wherein in the mating engagement the tapered interior surface is radially supported by the tapered outer shaft surface,
      wherein in the mating engagement the tapered outer shaft surface extends through the friction plate,
   a piston assembly,
      wherein the piston assembly is supported by the support member,
      wherein the piston is operative to be activated to move in an axial direction relative to the support member,
      wherein in the mating engagement, activation of the piston assembly is operative to cause rotation of the shaft,
      wherein both the friction plate and the support member are rotatable relative to the piston assembly,
   at least one friction disc,
      wherein the at least one friction disc is rotatable,
      wherein the at least one friction disc is arranged between the piston assembly and the friction plate,
      wherein activation of the piston assembly is operative to cause engagement of the at least one friction disc and the friction plate to impart rotation to the shaft,
   at least one biasing member,
      wherein at least a portion of the at least one biasing member is axially arranged between the piston assembly and the friction plate,
      wherein the at least one biasing member is operative to provide a force in an axial direction acting against the engagement.

2. The apparatus according to claim 1 wherein the support member includes a cylindrical hub and the friction plate, wherein the hub is connected to the friction plate,
   wherein the friction plate includes the tapered interior surface,
   wherein the piston assembly is radially supported by the hub,
   wherein the piston assembly is operative to be activated to move in an axial direction relative to the hub.

3. The apparatus according to claim 2 and further comprising a rotatable cylindrical pressure plate,
   wherein the pressure plate is axially movable relative to the friction plate responsive to activation of the piston assembly,
   wherein the pressure plate is rotatable with the friction plate,
      wherein the pressure plate is adapted to rotate relative to the piston assembly,
   wherein the pressure plate is arranged between the piston assembly and the at least one friction disc,
      wherein the at least one friction disc is arranged between the pressure plate and the friction plate,
         wherein the at least a portion of at least one biasing member is axially arranged between the pressure plate and the friction plate to provide a force biasing the pressure plate relative to the friction plate,
      wherein the pressure plate is adapted to engage the at least one friction disc responsive to activation of the piston assembly.

4. The apparatus according to claim 1 wherein the passage includes an axially extending tapered passage portion and an axially extending annular passage portion, wherein the annular passage portion abuts the tapered passage portion.

5. The apparatus according to claim 4 wherein the friction plate includes the tapered passage portion, wherein the hub includes the annular passage portion.

6. The apparatus according to claim 2 and further comprising
a housing,
  wherein the housing is about the hub,
  wherein the piston assembly is arranged adjacent the housing,
  wherein the piston assembly is operative to be activated to move axially relative to the housing,
at least one bearing assembly,
  wherein the at least one bearing assembly is arranged between the hub and the housing,
  wherein the at least one bearing assembly enables rotation of the hub relative to the housing.

7. The apparatus according to claim 2 wherein the clutch assembly arrangement further includes:
at least one connector member,
  wherein each connector member is sized to simultaneously extend in a hub opening and a friction plate opening to connect the hub to the friction plate.

8. The apparatus according to claim 1 wherein the support member comprises a cylindrical hub,
  wherein the hub includes the tapered interior surface,
  wherein the friction plate is radially supported by the hub,
  wherein the piston assembly is radially supported by the hub,
  wherein the piston assembly is operative to be activated to move in an axial direction relative to the hub.

9. The apparatus according to claim 8 and further comprising
a rotatable cylindrical pressure plate,
  wherein the pressure plate is arranged in mating relationship with the friction plate,
    wherein the pressure plate is rotatable with the friction plate,
    wherein the pressure plate is axially movable relative to the friction plate responsive to activation of the piston assembly,
  wherein the pressure plate is adapted to rotate relative to the piston assembly,
  wherein the pressure plate is arranged between the piston assembly and the at least one friction disc,
    wherein the at least one friction disc is arranged between the pressure plate and the friction plate,
  wherein the pressure plate is adapted to engage the at least one friction disc responsive to activation of the piston assembly,
  wherein the at least a portion of at least one biasing member is axially arranged between the pressure plate and the friction plate to provide a force biasing the pressure plate relative to the friction plate.

10. The apparatus according to claim 9 and further comprising at least one bearing assembly arranged between the piston assembly and the pressure plate,
  wherein the at least one bearing assembly is operative to enable rotation of the pressure plate relative to the piston assembly.

11. The apparatus according to claim 8 wherein the hub includes the passage,
  wherein the passage includes an axially extending tapered pressure portion and an axially extending annular passage portion, wherein the annular passage portion abuts the tapered passage portion.

12. The apparatus according to claim 8, wherein the friction plate is removably supported by the hub, wherein removal of the friction plate from the hub permits direct access to the at least one biasing member and at least one friction disc of the at least one friction disc.

13. The apparatus according to claim 1 wherein the piston assembly is cylindrical, wherein the piston assembly includes at least one fluid receiving port in fluid communication with a fluid passage, wherein the piston assembly is operative to be fluidly driven to move axially relative to the support member.

14. The apparatus according to claim 1 wherein the arrangement comprises a PTO clutch assembly, a shaft, and a bell housing, wherein the PTO clutch assembly is in connection with the shaft and the hell housing.

15. Apparatus including:
a PTO clutch assembly in operative connection with a bell housing and a rotatable shaft,
  wherein the clutch assembly includes at least a cylindrical hub and a piston assembly,
    wherein the hub includes a longitudinal axis,
    wherein the hub includes an axially extending tapered interior surface,
      wherein the tapered interior surface is mated in supporting engagement with a corresponding axially extending tapered exterior surface of the shaft,
  wherein the hub is radially supported by a shaft,
    wherein the piston assembly is radially supported by the hub,
    wherein the piston assembly is operative to be activated to move in an axial direction relative to the hub,
  a cylindrical friction plate rotatable relative to the piston assembly,
    wherein the tapered exterior shaft surface extends through the friction plate,
  at least one friction disc,
    wherein activation of the piston assembly is operative to cause engagement of the at least one friction disc and the friction plate to impart rotation to the shaft,
  a rotatable cylindrical pressure plate,
    wherein the pressure plate is arranged between the piston assembly and the at least one friction disc,
      wherein the pressure plate is axially movable relative to the friction plate responsive to activation of the piston assembly,
      wherein the pressure plate is rotatable with the friction plate,
  wherein the pressure plate is adapted to rotate relative to the piston assembly,
    wherein the at least one friction disc is arranged between the pressure plate and the friction plate,
  at least one biasing member,
    wherein the at least one biasing member is operative to provide a force in an axial direction acting against the engagement,
    wherein at least a portion of the at least one biasing member is axially arranged between the pressure plate and the friction plate.

16. A method of supporting a PTO clutch assembly in a bell housing, comprising:
(a) radially supporting a rotatable support member of the clutch assembly with a shaft comprising a longitudinal axis, wherein an axially extending tapered interior surface of the support member is in mated supporting relationship with a corresponding axially extending tapered exterior surface of the shaft; and (b) radially supporting a piston assembly of the clutch assembly with the support member, wherein the support member is rotatable relative to the piston assembly, wherein the piston assembly is operative to be activated to move in an axial direction relative to the support member to cause rotation of the shaft;

wherein the clutch assembly includes:
  a rotatable cylindrical friction plate,
    wherein in the mated supporting relationship the tapered exterior shaft surface extends through the friction plate,
    wherein the friction plate is rotatable relative to the piston assembly,
  at least one friction disc,
    wherein the at least one friction disc is rotatable,
    wherein the at least one friction disc is arranged between the piston assembly and the friction plate,
    wherein activation of the piston assembly is operative to cause engagement of the at least one friction disc and the friction plate to impart rotation to the shaft,
  at least one biasing member,
    wherein at least a portion of the at least one biasing member is axially arranged between the piston assembly and the friction plate,
    wherein the at least one biasing member is operative to provide a force in an axial direction acting against the engagement.

17. The method according to claim 16 and further comprising:

(c) prior to step (a), removing a mechanical clutch assembly from an existing bell housing, wherein the mechanical clutch assembly includes mechanical linkage, wherein steps (a) and (b) are performed during a retrofit operation.

18. The method according to claim 17 wherein step (c) includes removing the mechanical clutch assembly from an existing drive shaft, wherein the shaft in step (a) comprises the existing drive shaft, wherein step (a) includes reusing the existing drive shaft.

19. The method according to claim 16 wherein step (a) includes placing the clutch assembly on the shaft as a single unit.

20. The method according to claim 16 and further comprising:

(c) activating the piston assembly to cause the shaft to rotate.

* * * * *

UNITED STATES PATENT AND TRADEMARK OFFICE
CERTIFICATE OF CORRECTION

| | | |
|---|---|---|
| PATENT NO. | : 7,225,909 B1 | Page 1 of 1 |
| APPLICATION NO. | : 10/998184 | |
| DATED | : June 5, 2007 | |
| INVENTOR(S) | : Kalinsky et al. | |

It is certified that error appears in the above-identified patent and that said Letters Patent is hereby corrected as shown below:

Column 14, Line 13, "wherein the piston is" should read --wherein the piston assembly is--.

Column 15, Line 7, "wherein the housing is about" should read --wherein the housing is arranged about--.

Column 15, Line 63, "pressure portion" should read --passage portion--.

Column 16, Line 13, "the hell housing" should read --the bell housing--.

Signed and Sealed this

Thirty-first Day of July, 2007

JON W. DUDAS
*Director of the United States Patent and Trademark Office*